(12) United States Patent
Tsai

(10) Patent No.: US 10,189,104 B2
(45) Date of Patent: Jan. 29, 2019

(54) ROTATABLE ELECTRIC HEATING TOOL

(71) Applicant: GOODHOUSE Enterprise Co. Ltd., Taichung (TW)

(72) Inventor: Jung-Fa Tsai, Taichung (TW)

(73) Assignee: Goodhouse Enterprise Co. Ltd., Taichung (TW)

(*) Notice: Subject to any disclaimer, the term of this patent is extended or adjusted under 35 U.S.C. 154(b) by 713 days.

(21) Appl. No.: 14/872,291

(22) Filed: Oct. 1, 2015

(65) Prior Publication Data

US 2016/0332246 A1    Nov. 17, 2016

(30) Foreign Application Priority Data

May 13, 2015    (TW) .............................. 104115167 A

(51) Int. Cl.
*H05B 3/42*    (2006.01)
*B23K 3/03*    (2006.01)

(52) U.S. Cl.
CPC .......... *B23K 3/0323* (2013.01); *B23K 3/0361* (2013.01)

(58) Field of Classification Search
CPC ...... B23K 3/03; B23K 3/0307; B23K 3/0315; B23K 3/0323; B23K 3/0338; B23K 3/0346; B23K 3/0353; B23K 3/0361; B23K 20/125; B23K 35/0222
USPC ................................................... 219/238, 244
See application file for complete search history.

(56) References Cited

U.S. PATENT DOCUMENTS 3,699,306 A * 10/1972 Finch ................... B23K 3/0338
219/236

* cited by examiner

*Primary Examiner* — Dana Ross
*Assistant Examiner* — Brandon Harvey
(74) *Attorney, Agent, or Firm* — Alan D. Kamrath; Kamrath IP Lawfirm, P.A.

(57) ABSTRACT

An electric heating tool includes a handle device and a heating device rotatably mounted to the handle device. The handle device includes a body, a power connection member, and a sleeve. The power connection member is received in the body, and the sleeve mounted around the body. The heating device includes a seat and a heating member. The seat rotatably engaged with the sleeve. The heating member is mounted to the seat and is slidely and electrically connected to the power connection member.

16 Claims, 11 Drawing Sheets

ROTATABLE ELECTRIC HEATING TOOL

BACKGROUND OF THE INVENTION

The present invention relates to an electric heating tool and, more particularly, to a rotatable electric heating tool.

A typical soldering iron includes a handle and a tip. After plugging in or mounting a battery into the handle to provide electrical connection with the tip, the tip generates heat by electric current passing therethrough, providing a high temperature for soldering operation.

However, the tip is generally fixed to the handle such that troublesome processing operations are required in manufacture of the soldering iron. Furthermore, a worker must fix the tip to the handle by a special technique, increasing the manufacturing costs of the soldering iron.

Furthermore, the tip is generally pointed to not be efficiently applied to a large operation area.

Thus, a need exists for a rotatable electric heating tool to overcome the disadvantages of the conventional soldering irons.

BRIEF SUMMARY OF THE INVENTION

An electric heating tool according to the present invention includes a handle device and a heating device.

The handle device includes a body, a power connection member, and a sleeve. The body includes a protrusion having an inner edge. The power connection member is received in the inner edge of the protrusion and includes a first electrode, a second electrode, a first extending portion, and a second extending portion. The first electrode is electrically connected to first extending portion, and the second electrode is electrically connected to the second extending portion. The sleeve is mounted around the protrusion and includes a guiding recess located at an inner periphery thereof.

The heating device is rotatably mounted to the handle device and includes a seat, a heating member, and a third electrode. The seat includes at least one guiding portion rotatably engaged in the guiding recess of the sleeve. The heating member is mounted to the seat. The third electrode is mounted to the seat and is electrically connected to the heating member. The third electrode is slidely and electrically connected to the first electrode of the power connection member. The heating member is slidely and electrically connected to the second electrode of the power connection member.

Other objectives, advantages, and novel features of the present invention will become clearer in light of the following detailed description described in connection with the accompanying drawings.

DESCRIPTION OF THE DRAWINGS

The illustrative embodiments may best be described by reference to the accompanying drawings where.

Figure 1:
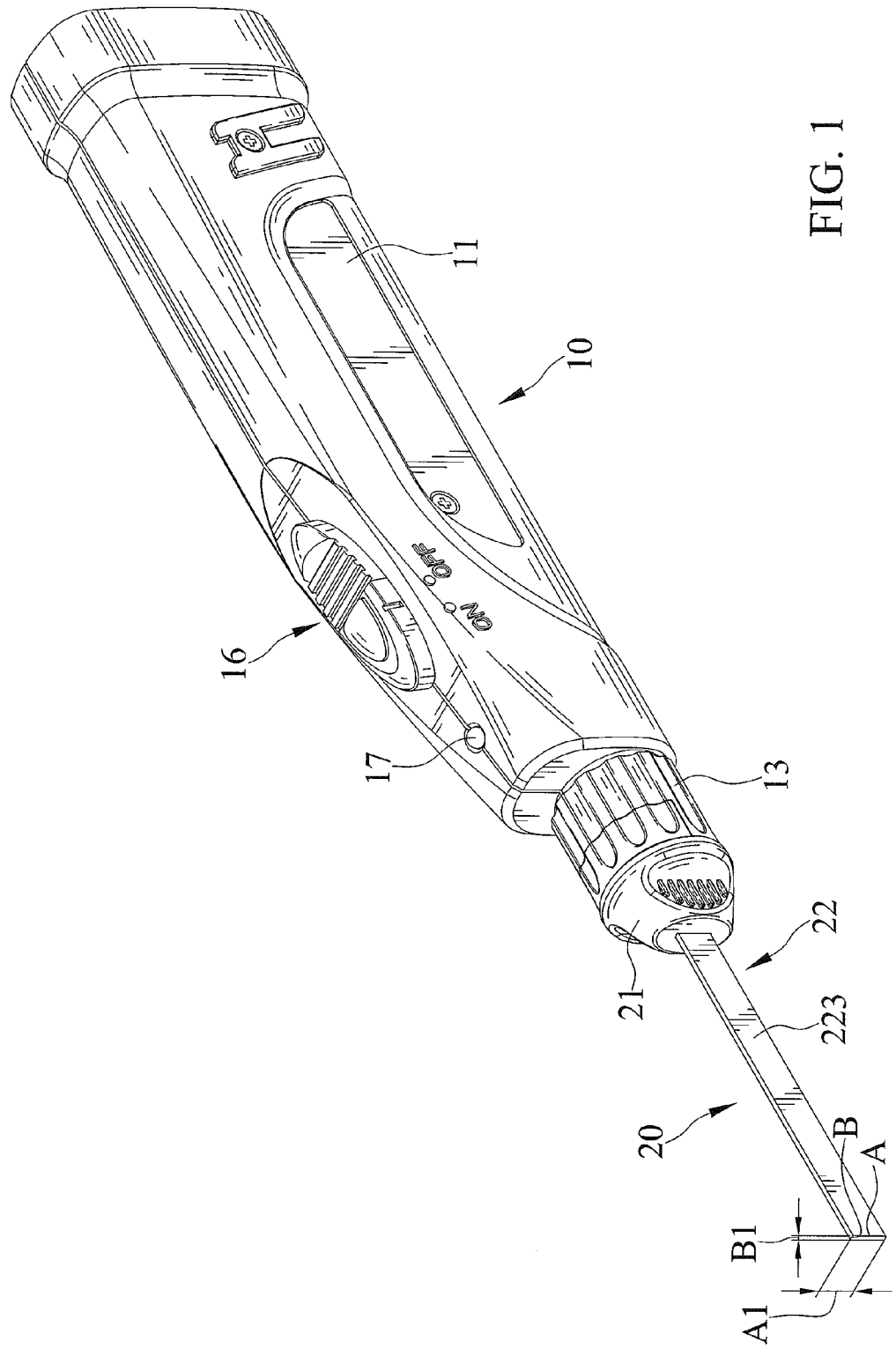
FIG. 1 is a perspective view of an electric heating tool of a first embodiment according to the present invention.
Figure 2:
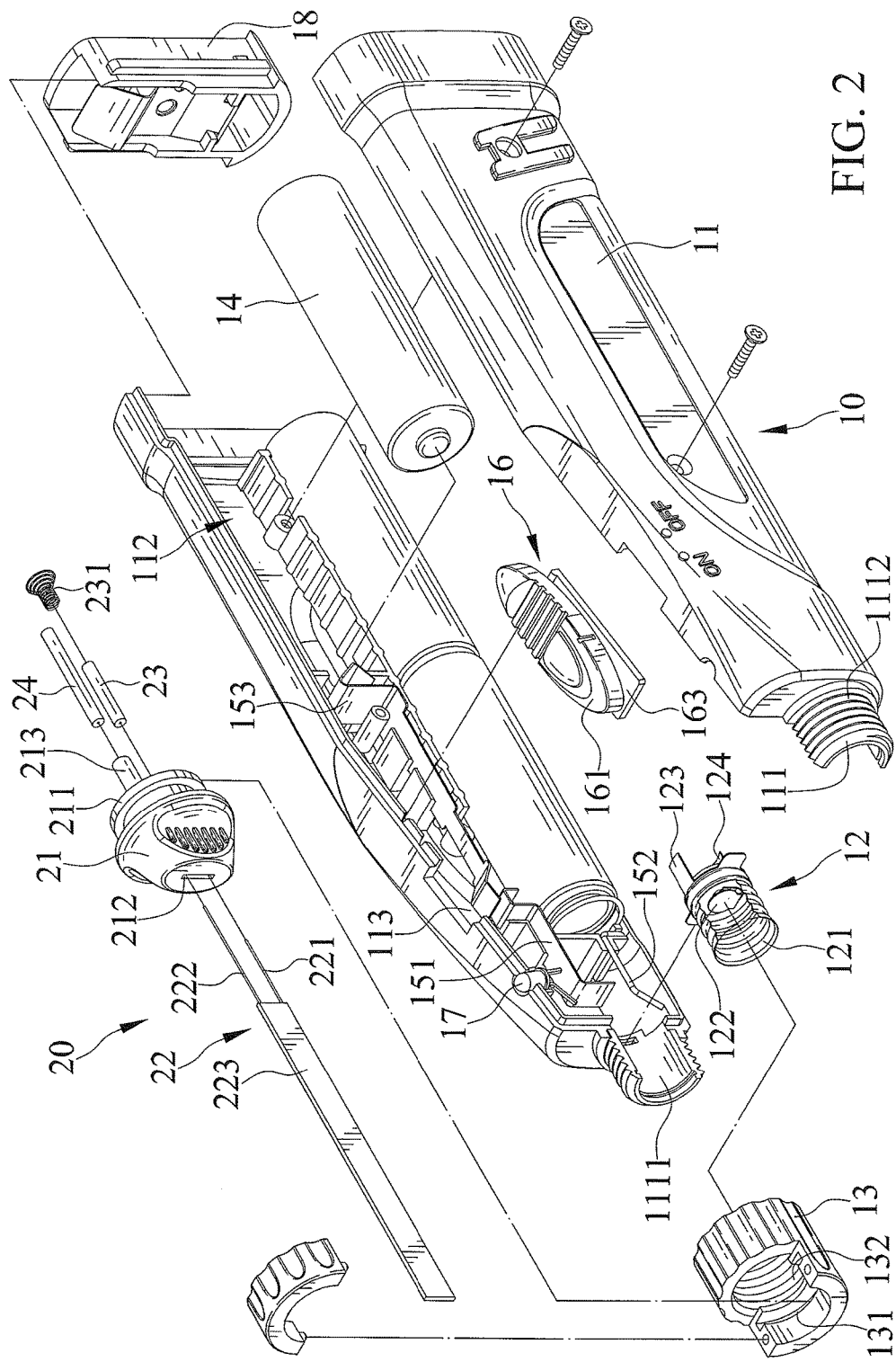
FIG. 2 is an exploded, perspective view of the electric heating tool of FIG. 1.
Figure 3:
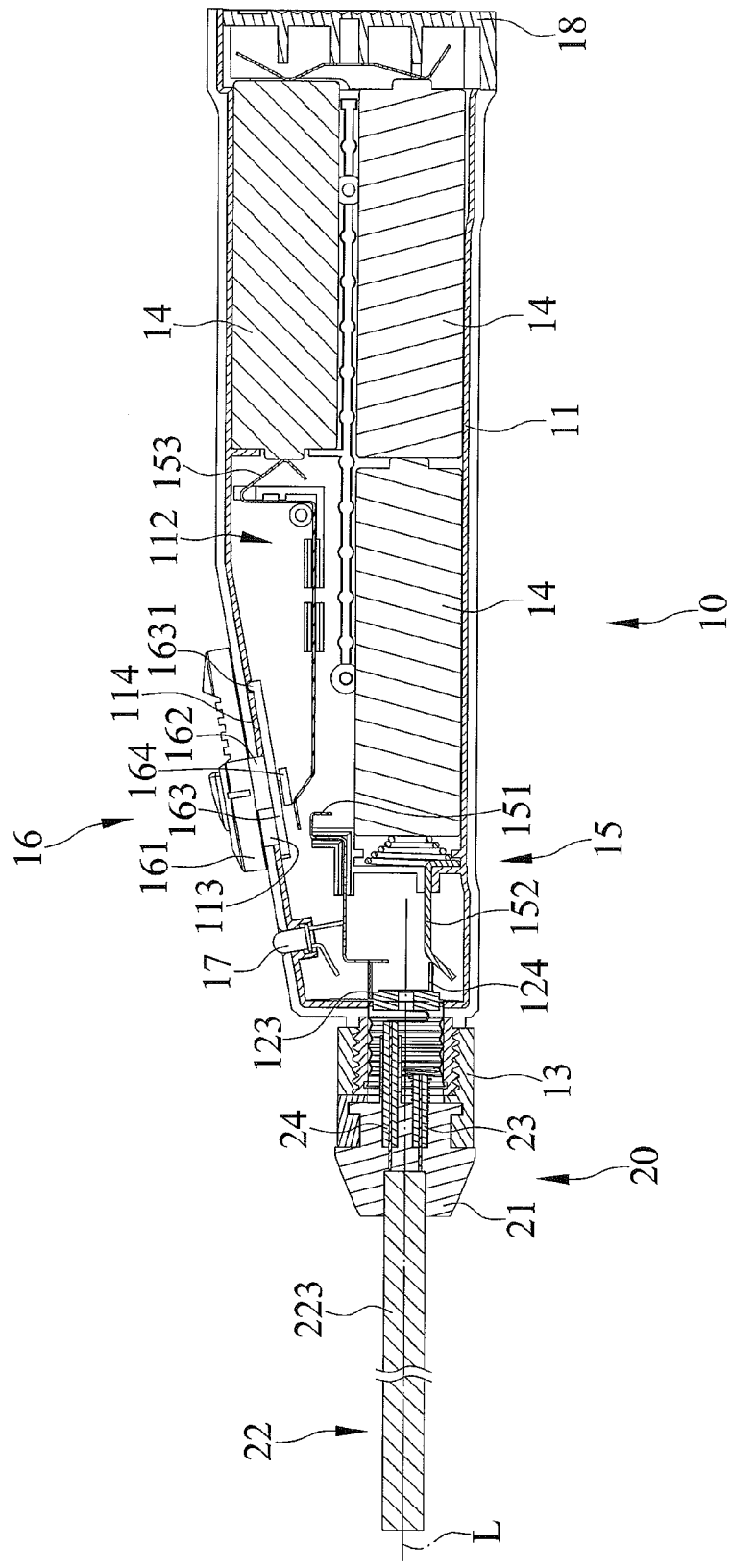
FIG. 3 is a cross sectional view of the electric heating tool of FIG. 1.
Figure 4:
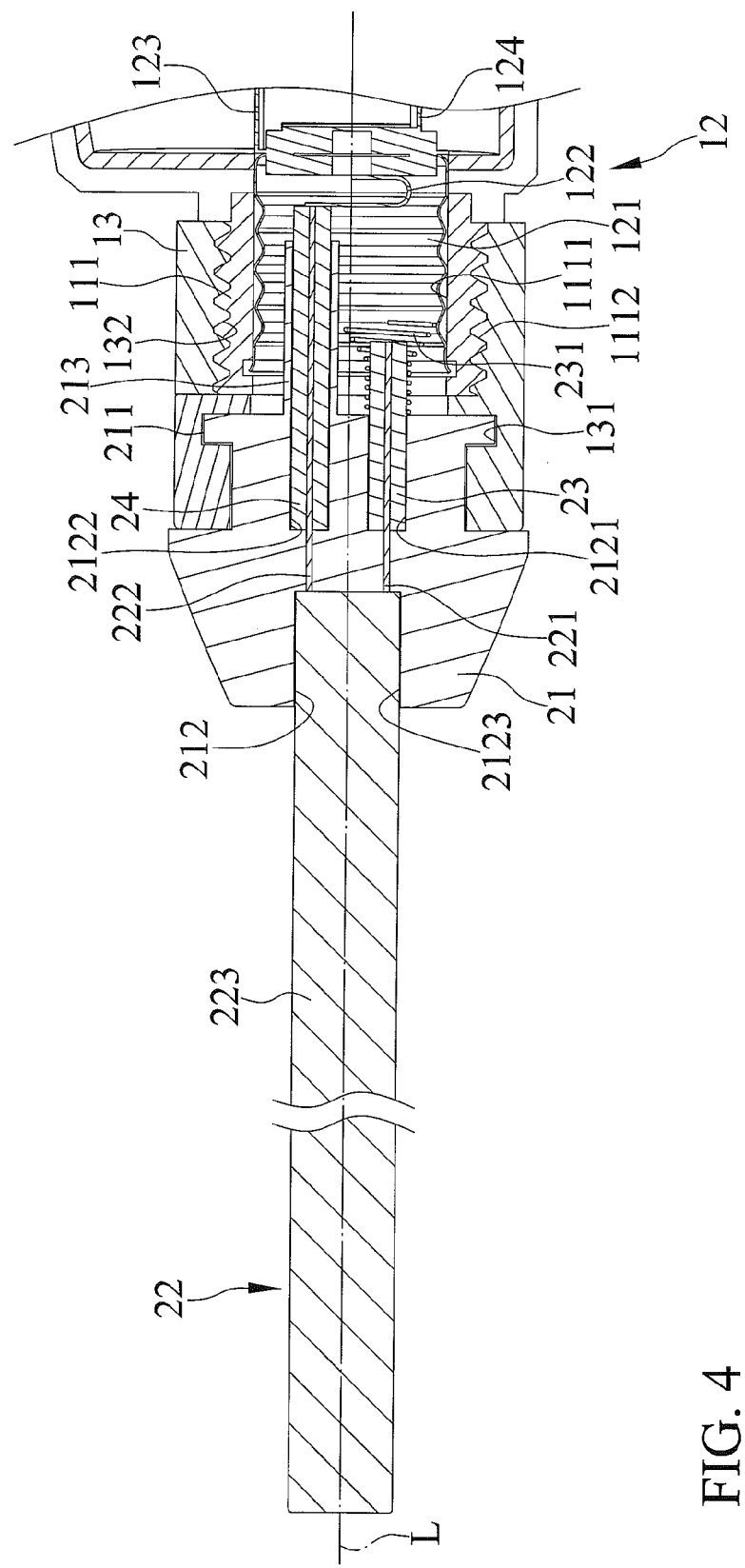
FIG. 4 is a partial, enlarged view of the electric heating tool of FIG. 3.
Figure 5:
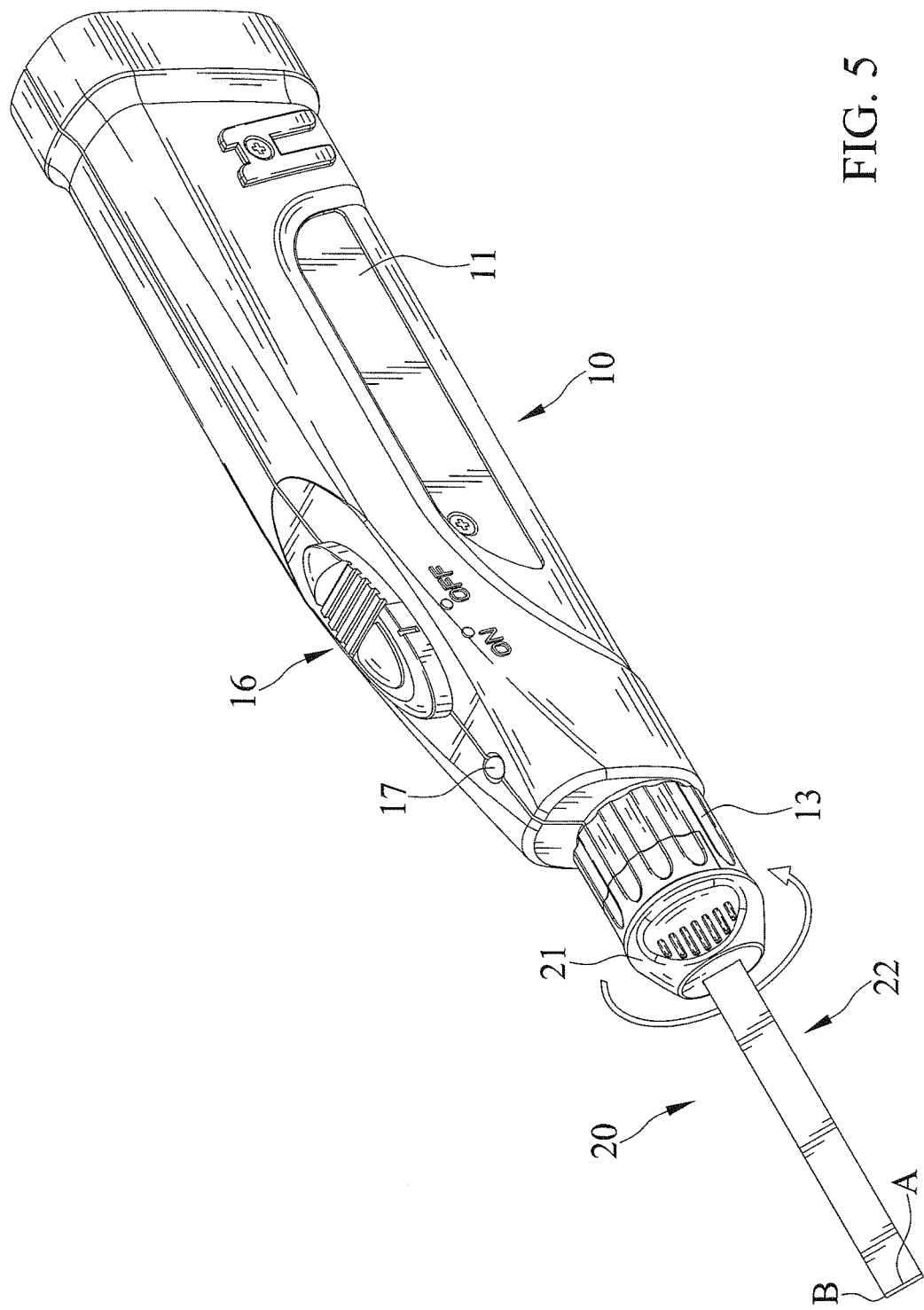
FIG. 5 is a perspective view of the electric heating tool of FIG. 1 and illustrating a heating device rotatable in relation to a handle device along an arrow.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "side", "end", "portion", "spacing", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

FIGS. 1-5 show an electric heating tool of a first embodiment according to the present invention includes a handle device 10 and a heating device 20 rotatably mounted to the handle device 10. The handle device 10 is adapted to be gripped by a user. The heating device 20 is adapted to generate high heat to melt a solder.

The handle device 10 includes a body 11, a power connection member 12, a sleeve 13, a battery assembly 14, an electrical conduction assembly 15, a control button 16, an indicator light 17, and an end cap 18. In the embodiment, the body 11, the sleeve 13, and the control button 16 are made of electrically insulating materials. The power connection member 12 and the electrical conduction assembly 15 are made of electrically conductive materials.

The body 11 includes a protrusion 111, a receiving space 112, a guiding slot 113, and two positioning slots 114. The protrusion 111 has an inner edge 1111 interconnected with the receiving space 112, and an outer threaded portion 1112 formed around the protrusion 111. The guiding slot 113 is interconnected with the receiving space 112. The two positioning slots 114 are disposed adjacent to the guiding slot 113 and are orderly arranged along a sliding direction of the control button 16.

The power connection member 12 is received in the inner edge 1111 of the protrusion 111 and includes a first electrode 121, a second electrode 122, a first extending portion 123, and a second extending portion 124. The first electrode 121 is electrically connected to first extending portion 123, with the second electrode 122 is electrically connected to the second extending portion 124. In the embodiment, the power connection member 12 includes a first end and a second end spaced from the first end. The first electrode 121 and the second electrode 122 are located at the first end of the power connection member 12. The first extending portion 123 and the second extending portion 124 are located at the second end of the power connection member 12 and respectively extend towards the receiving space 112. In a preferred form, the first electrode 121 of the power connection member 12 substantially has a shape of a hollow cylinder and is abutted against the inner edge 1111 of the protrusion 111. A side of the second electrode 122 of the power connection member 12 adjacent to the heating device 20 substantially has a shape of a disk.

The sleeve 13 includes a guiding recess 131 located at an inner periphery thereof, and an inner threaded portion 132 formed around the inner periphery thereof and engaged with the outer threaded portion 1112 of the protrusion 111 of the body 11. In the embodiment, the sleeve 13 substantially has a shape of a hollow cylinder and has an axis L.

The battery assembly 14 and the electrical conduction assembly 15 are received in the receiving space 112 of the body 11 and are electrically connected with each other. The battery assembly 14 includes a first pole and a second pole opposite to the first pole. In the embodiment, the battery assembly 14 includes three batteries, and the first pole is a cathode, the second pole is an anode.

The electrical conduction assembly 15 includes a first electrical conduction member 151, a second electrical conduction member 152, and a third electrical conduction member 153. The first electrical conduction member 151 includes a first end and a second end spaced from the first end thereof. The first end of the first electrical conduction member 151 is electrically connected to the first extending portion 123. The second electrical conduction member 152 includes a first end and a second end spaced from the first end thereof. The first end of the second electrical conduction member 152 is electrically connected to the second extending portion 124, and the second end of the second electrical conduction member 152 is electrically connected to the first pole of the battery assembly 14. The third electrical conduction member 153 includes a first end and a second end spaced from the first end thereof. The first end of the third electrical conduction member 153 is releasably and electrically connected to the second end of the first electrical conduction member 151, and the second of the third electrical conduction member 153 is electrically connected to the second pole of the battery assembly 14.

The control button 16 is slidely mounted to the body 11 and is adapted to push the first end of the third electrical conduction member 153 to contact with the first electrical conduction member 151 for generating high heat by the heating device 20. The control button 16 includes a pushing portion 161, a connecting portion 162, a positioning portion 163, and an abutting portion 164. The connecting portion 162 is located between the pushing portion 161 and the positioning portion 163. The abutting portion 164 is disposed at an end of the positioning portion 163 opposite to the connecting portion 162. The connecting portion 162 is slidely received in the guiding slot 113. The positioning portion 163 includes a flange 1631 extending towards the pushing portion 161 to be engageable into one of the two positioning slots 144. The abutting portion 164 selectively pushes the first end of the third electrical conduction member 153 to facilitate the second end of the first electrical conduction member 151 and the first end of the third electrical conduction member 153 to electrically connect with each other, so that the heating device 20 can be operated for generating heat.

The indicator light 17 is located on the body 11 and is electrically connected to the first electrical conduction member 151 to be adapted to use electricity of the battery assembly 14 to emit light while the heating device 20 being operated.

The end cap 18 is releasably attached to the body 11 to seal the receiving space 112 of the body 11 to prevent the battery assembly 14 and the electrical conduction assembly 15 disengaging from the receiving space 112 of the body 11.

The heating device 20 includes a seat 21, a heating member 22, a third electrode 23, and a fourth electrode 24. The first electrode 121 of the power connection member 12 encircles the second electrode 122 of the power connection member 12, one end of the heating member 22 adjacent to the second electrode 122, the third electrode 23, and the fourth electrode 24. In the embodiment, the seat 21 is made of electrically insulating materials. The heating member 22, the third electrode 23, and the fourth electrode 24 are made of electrically conductive materials.

The seat 21 includes a guiding portion 211, a through-hole 212, and a protruded portion 213. The guiding portion 211 is formed around an outer periphery of the seat 21 and is rotatably engaged in the guiding recess 131 of the sleeve 13 about the axis L. The through-hole 212 extends through the seat 21 and receives the heating member 22 and the third electrode 23. The through-hole 212 includes a first section 2121, a second section 2122 parallel to the first section 2121 and extending through the protruded portion 213, and a third section 2123 interconnected with the first section 2121 and the second section 2122. The third electrode 23 is received into the first section 2121, and the fourth electrode 24 is received into the second section 2122. An end of the third electrode 23 adjacent to the first and second extending sections 221 and 222 is received into the third section 2123. The protruded portion 213 is formed on an end of the seat 21 and is adjacent to the guiding portion 211 to prevent the third electrode 23 and the fourth electrode 24 contacted each other.

The heating member 22 is adapted to use electricity of the battery assembly 14 to generate high heat to melt a solder. The heating member 22 is mounted to the seat 21 and includes a first extending section 221, a second extending section 222, and a heating portion 223. The first extending section 221 and the second extending section 222 are respectively connected with and extended from the heating portion 223. The first extending section 221 inserts through and electrically connects to the third electrode 23 received in the first section 2121 of the through-hole 212. The second extending section 222 inserts through and electrically connects to the fourth electrode 24 received in the second section 2122 of the through-hole 212. The third electrode 23 includes a conduction coil 231 slidely and electrically connected to the first electrode 121 of the power connection member 12. In the embodiment, the heating member 22 is a rectangular sheet, and an end face of the heating member 22 opposite to the seat 21 has a rectangular cross-section. A rectangular end face of the heating member 22 has a first side A and a second side B perpendicular to each other. In a preferred form, a first side length A1 of the first side A at least fivefold larger than a second side length B1 of the second side B. Thus, a user can rotate the seat 21 in relation to the handle device 10 to choice the first side A or the second side B of the heating member 22 to melt a solder for applying to various occasions.

The user can push the pushing portion 161 of the control button 16 to cause the abutting portion 164 pushing the first end of the third electrical conduction member 153 to electrically connect to the second end of the first electrical conduction member 151. Thus, an electric current produced from the battery assembly 14 flows through the third electrical conduction member 153, the first electrical conduction member 151, the first extending portion 123 of the power connection member 12, the first electrode 121, the conduction coil 231 of the third electrode 23, the heating member 22, the fourth electrode 24, the second electrode 122, the second extending portion 124 of the power connection member 12, and the second electrical conduction member 152, then, the electric current flows return to the battery assembly 14 to form a current loop. The electric current continually passes through the heating member 22 resulting in the heating portion 223 generating high heat for melting a solder. At the same time, the indicator light 17 emits light to indicate the heating device 20 already operated.

Figure 6:
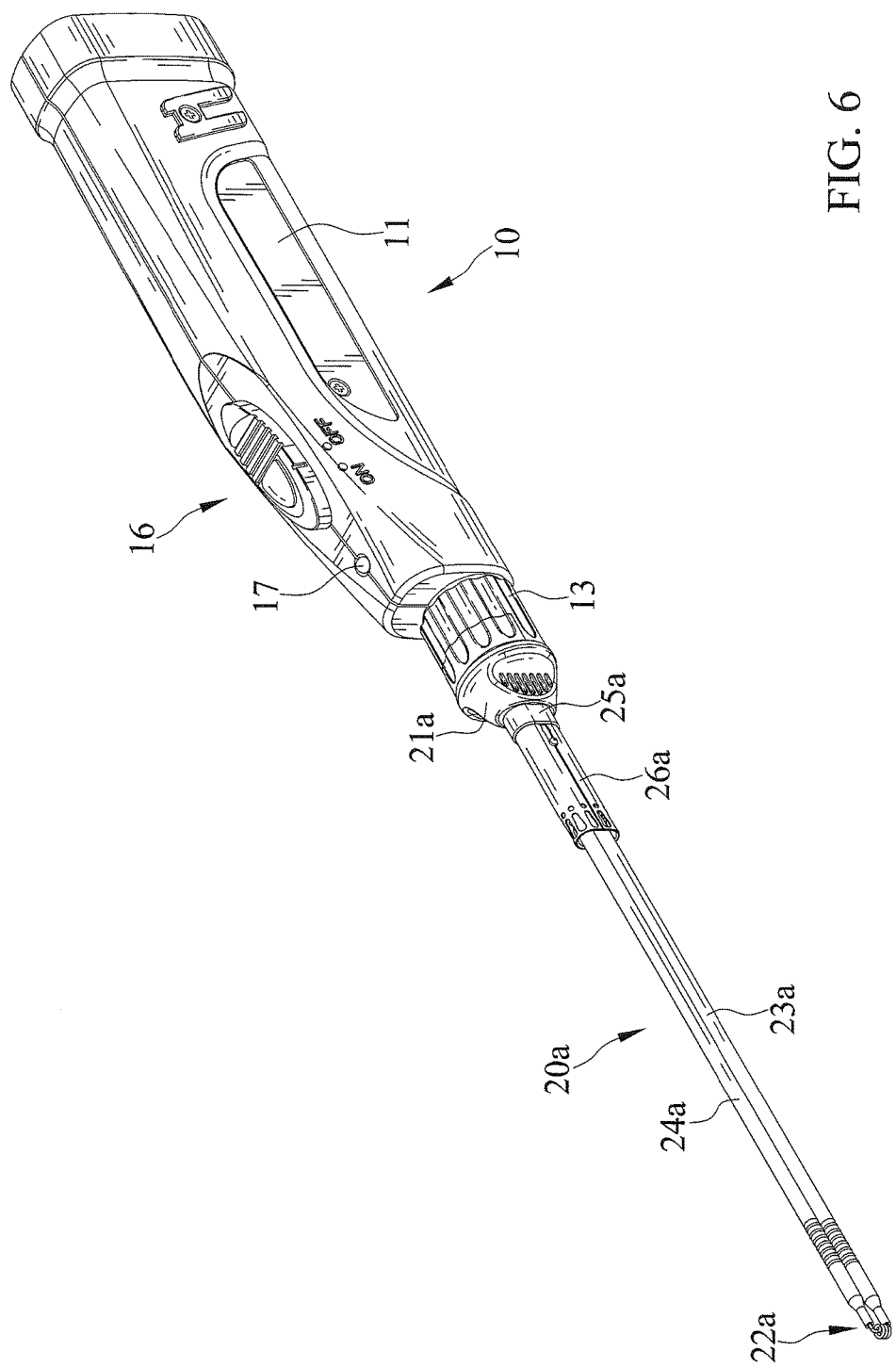
FIG. 6 is a perspective view of an electric heating tool of a second embodiment according to the present invention.
Figure 7:
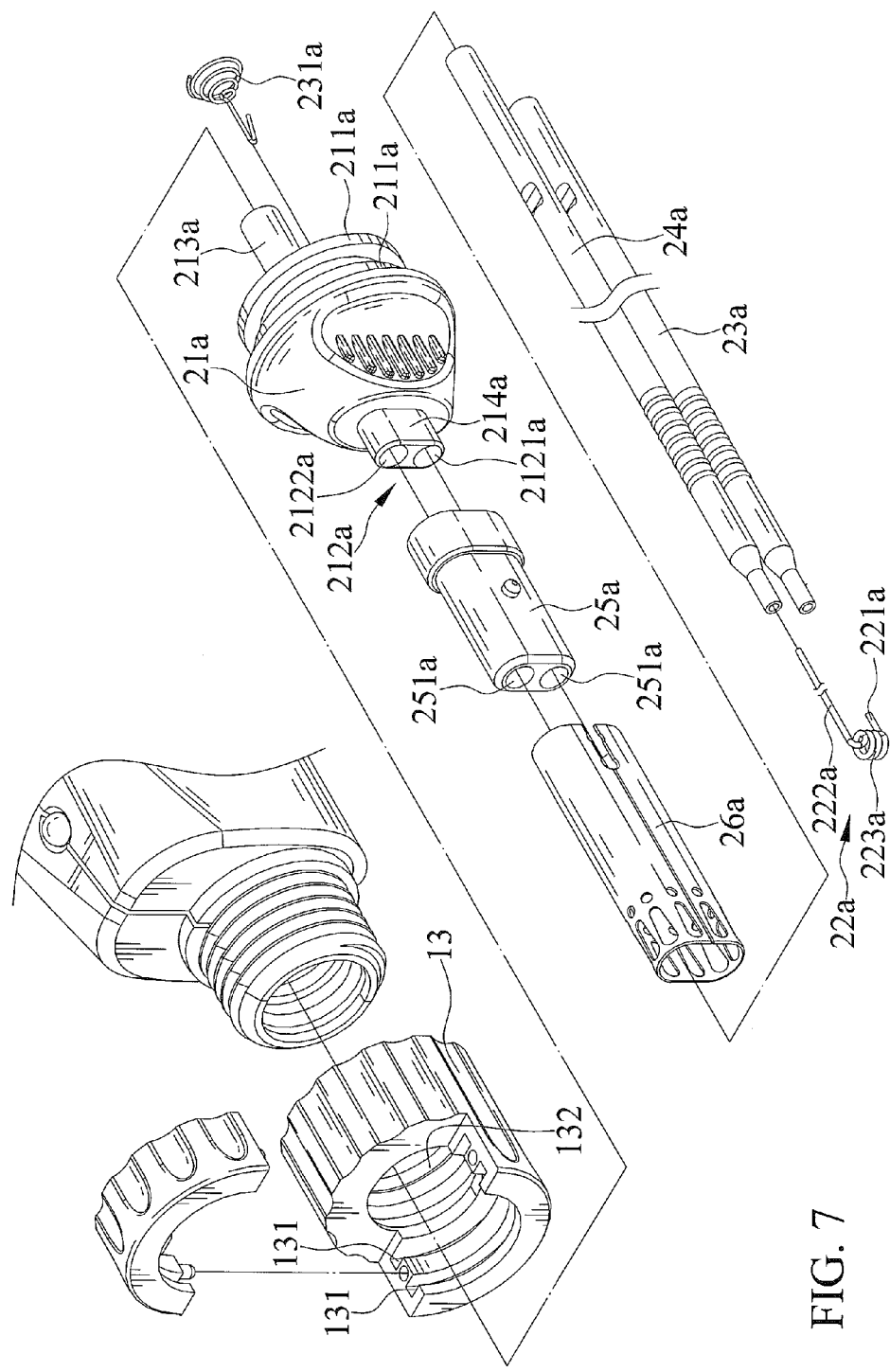
FIG. 7 is a partial, exploded view of the electric heating tool of FIG. 6.
Figure 8:
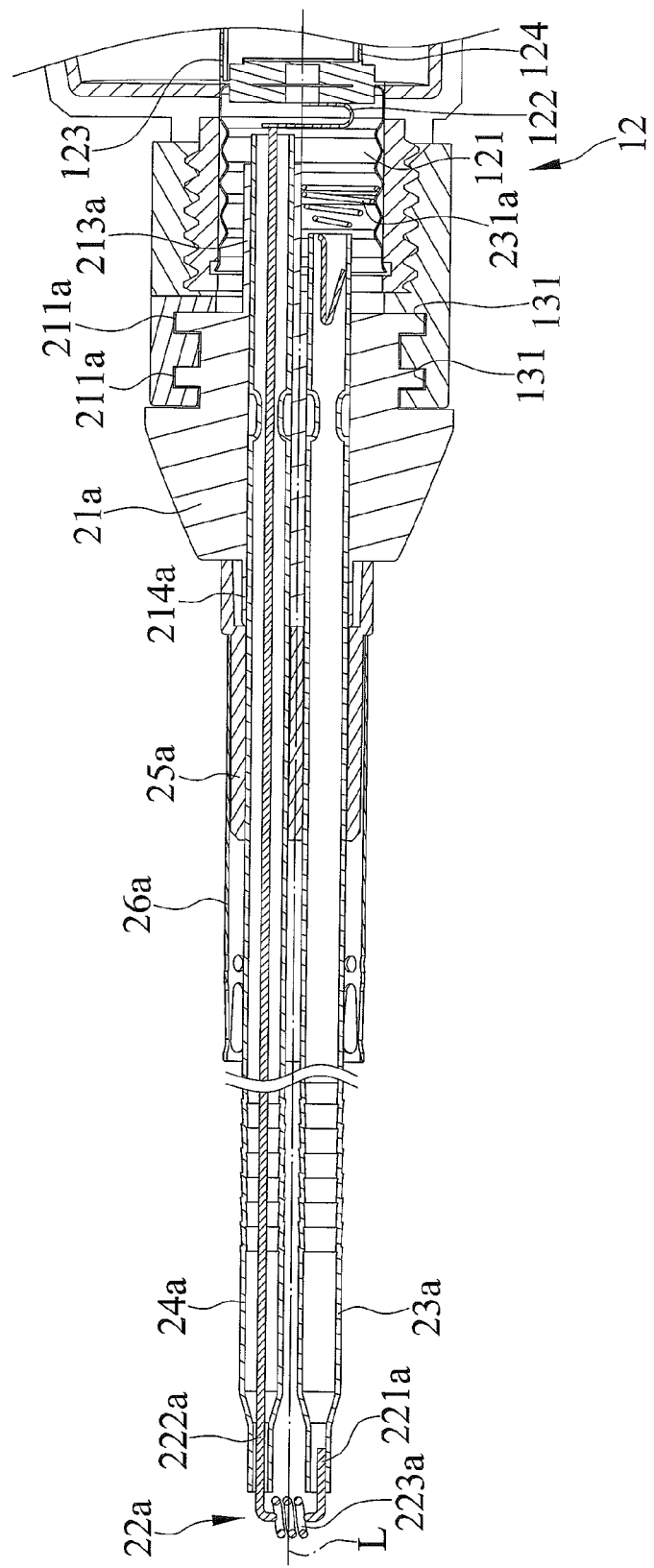
FIG. 8 is a partial, enlarged cross sectional view of the electric heating tool of FIG. 6.

FIGS. 6-8 show an electric heating tool of a second embodiment according to the present invention. The second embodiment is substantially the same as the first embodiment except that the sleeve 13 includes two guiding recesses 131 located at an inner periphery thereof and parallel to each other along the axis L.

The heating device 20a includes a seat 21a, a heating member 22a, a third electrode 23a, a fourth electrode 24a, and a jacket 25a, and a housing 26a. The seat 21a is rotatably engaged in the guiding recess 131 of the sleeve 13. The jacket 25a is connected to the seat 21a. The third electrode 23a and the fourth electrode 24a inserts through the seat 21a and the jacket 25a. The housing 26a is connected with the jacket 25a and encircles the third electrode 23a and the fourth electrode 24a. In the embodiment, the seat 21a is made of electrically insulating materials. The heating member 22a and the third electrode 23a are made of electrically conductive materials.

The seat 21a includes two guiding portions 211a, a through-hole 212a, and a protruded portion 213a, and an extruded portion 214a. The two guiding portions 211a are formed around an outer periphery of the seat 21a and are parallel to each other along the axis L. The two guiding portions 211a are rotatably engaged in the two guiding recesses 131 of the sleeve 13 about the axis L, respectively. The protruded portion 213a and the extruded portion 214a are respectively formed on two opposite ends of the seat 21a. The protruded portion 213a is adjacent to the two guiding portions 211a to prevent the third electrode 23a and the fourth electrode 24a contacted each other.

The through-hole 212a includes a first section 2121a, and a second section 2122a parallel to the first section 2121a. The first section 2121a extends through the extruded portion 214a and receives the third electrode 23a. The second section 2122a extends through the protruded portion 213a and the extruded portion 214a and receives the fourth electrode 24a The heating member 22a includes a first extending section 221a, a second extending section 222a, and a heating portion 223a. The first extending section 221a and the second extending section 222a are respectively connected with and extended from two opposite ends of the heating portion 223a. The first extending section 221a electrically connects to the third electrode 23a. The second extending section 222a inserts through the fourth electrode 24a and electrically connects to the second electrode 122 of the power connection member 12. In the embodiment, the heating portion 223a is substantially formed as a heating coil. The third electrode 23a includes a conduction coil 231a slidely and electrically connected to the first electrode 121 of the power connection member 12.

The jacket 25a is connected to the extruded portion 214a of the seat 21a and includes two orifice 251a extending therethrough and interconnected with the first section 2121a and the second section 2122a of the through-hole 212a. The third electrode 23a inserts through one of the two orifices 251a, and the fourth electrode 24a insers through the other one of the two orifices 251a.

Figure 9:
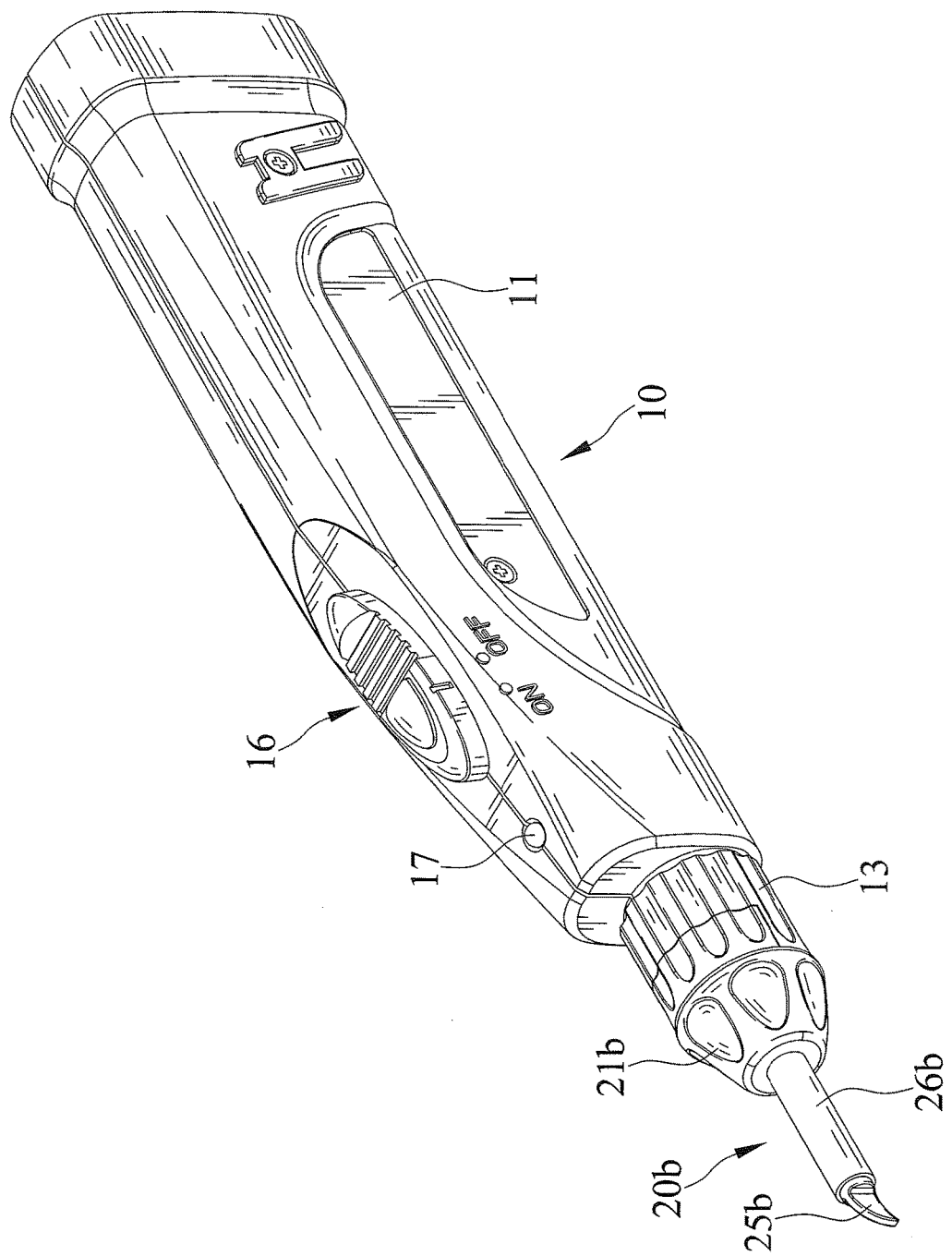
FIG. 9 is a perspective view of an electric heating tool of a third embodiment according to the present invention.
Figure 10:
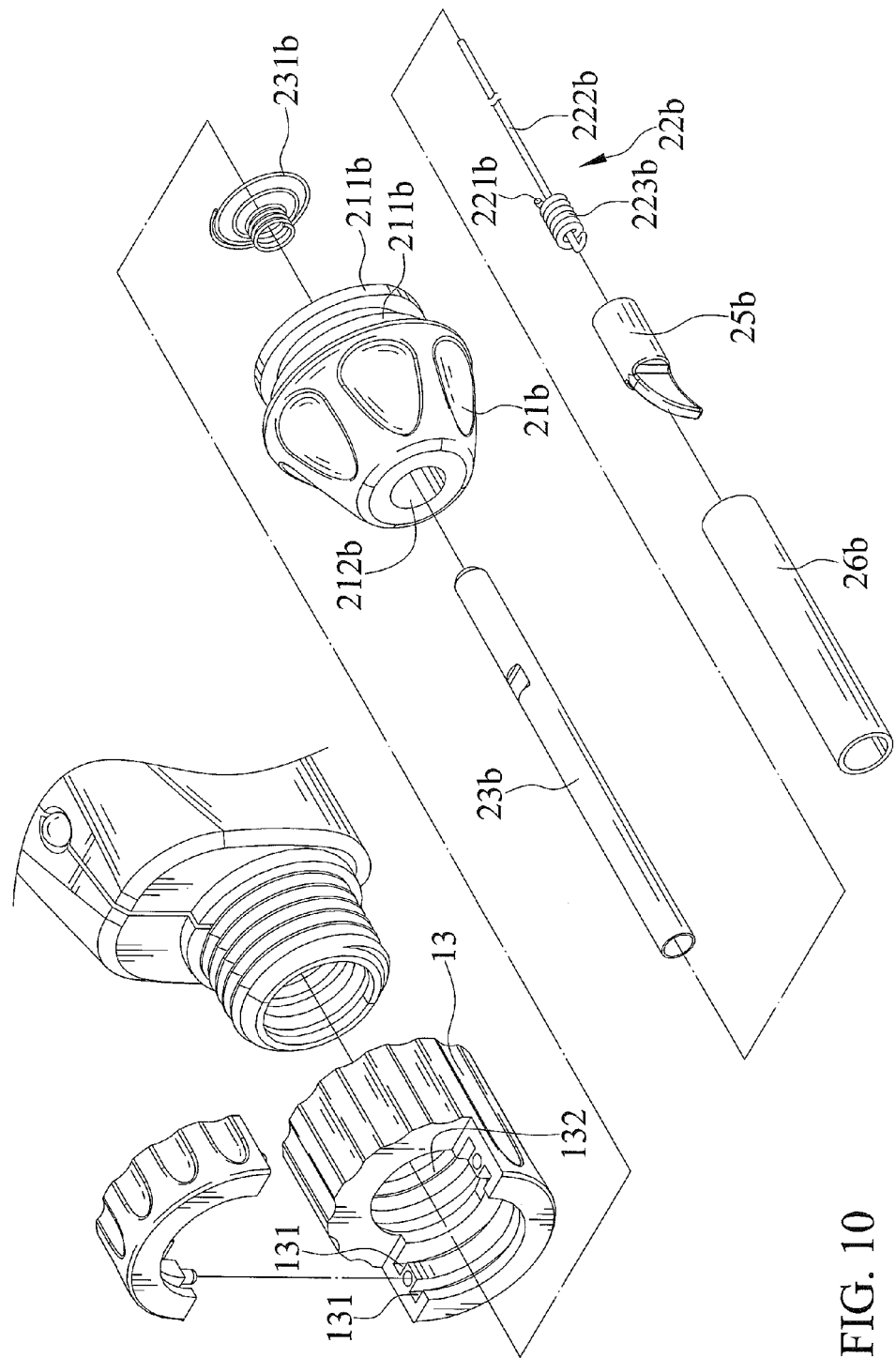
FIG. 10 is a partial, exploded view of the electric heating tool of FIG. 9.
Figure 11:
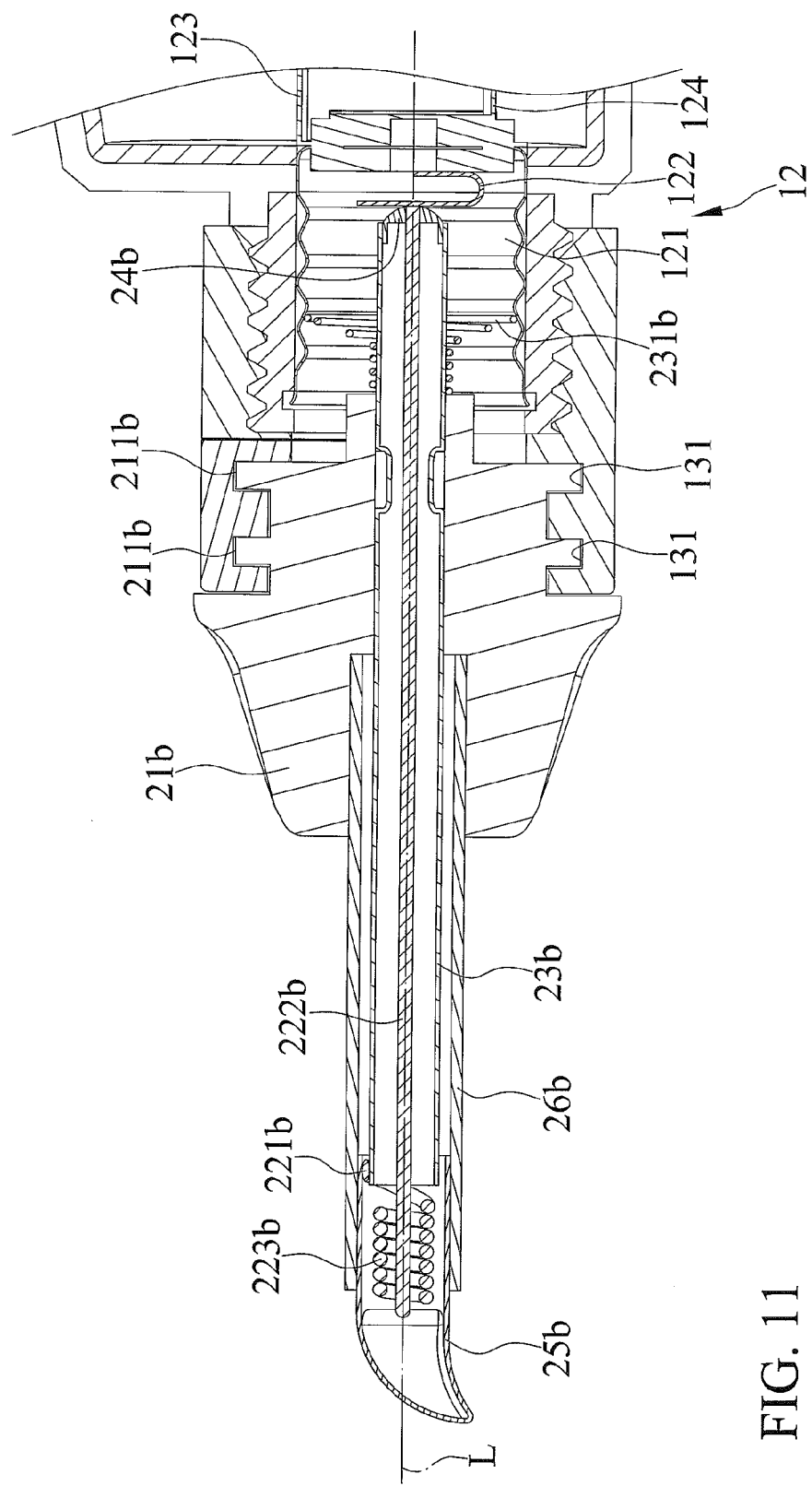
FIG. 11 is a partial, enlarged cross sectional view of the electric heating tool of FIG. 9.

FIGS. 9-11 show an electric heating tool of a third embodiment according to the present invention. The third embodiment is substantially the same as the first embodiment except that the sleeve 13 includes two guiding recesses 131 located at an inner periphery thereof and parallel to each other along the axis L.

The heating device 20b includes a seat 21b, a heating member 22b, a third electrode 23b, an insulation member 24b, a thermal conduction member 25b, and an isolation tube 26b. The seat 21b is rotatably connected to the sleeve 13. The heating member 22b inserts through the third electrode 23b inserting through the seat 21b. The insulation member 24b is located between the third electrode 23b and the heating member 22b to prevent third electrode 23b and the heating member 22b connected to each other. The thermal conduction member 25b is mounted to the heating member 22b. The isolation tube 26b is connected to the seat 21b. The heating member 22b, the third electrode 23b, the insulation member 24b, the thermal conduction member 25b, and the isolation tube 26b are rotatable respect to the handle device 10 about the axis L. In the embodiment, the insulation member 24b and the isolation tube 26b are made of electrically insulating materials. The heating member 22b and the third electrode 23b are made of electrically conductive materials.

The seat 21b includes two guiding portions 211b and a through-hole 212b. The two guiding portions 211b are formed around an outer periphery of the seat 21b and are parallel to each other along the axis L. The two guiding portions 211b are rotatably engaged in the two guiding recesses 131 of the sleeve 13 about the axis L, respectively. The through-hole 212b extends through two opposite ends of the seat 21b. The third electrode 23b inserts through the through-hole 212b.

The heating member 22b includes a first extending section 221b, a second extending section 222b, and a heating portion 223b. The first extending section 221b and the second extending section 222b are respectively connected with and extended from two opposite ends of the heating portion 223b. The first extending section 221b electrically connects to the third electrode 23b. The second extending section 222b electrically connects to the second electrode 122 of the power connection member 12. The heating portion 223b encircles the second extending section 222b. The insulation member 24b is connected to the second extending section 222b and is received between the third electrode 23b and the second extending section 222b. The thermal conduction member 25b is connected to the heating portion 223b. Thus, the thermal conduction member 25b can absorb high heat energy produced from the heating portion 223b to melt a solder. The first extending section 221b is located between the thermal conduction member 25b and the third electrode 23b. The third electrode 23b includes a conduction coil 231b slidely and electrically connected to the first electrode 121 of the power connection member 12.

Although preferred embodiments of the present invention have been illustrated and described, they should not be construed to restrict the scope of the present invention. Therefore, modifications to numerical values or substitution of equivalent members thereof or equivalent changes and modifications based on the accompanying claims of the present invention still fall within the scope covered by the present invention.

The invention claimed is:

1. An electric heating tool comprising:
a handle device including a body, a power connection member, and a sleeve, with the body including a protrusion having an inner edge, with the power connection member received in the inner edge of the protrusion and including a first electrode, a second electrode, a first extending portion, and a second extending portion, with the first electrode electrically connected to the first extending portion, with the second electrode electrically connected to the second extending portion, with the sleeve mounted around the protrusion, with the sleeve including a guiding recess located at an inner periphery thereof; and
a heating device rotatably mounted to the handle device and including a seat, a heating member, and a third electrode, with the seat including a guiding portion rotatably engaged in the guiding recess of the sleeve, with the heating member mounted to the seat, with the third electrode mounted to the seat and electrically connected to the heating member, with the third electrode slidely and electrically connected to the first electrode of the power connection member, and with the heating member slidely and electrically connected to the second electrode of the power connection member.

2. The electric heating tool according to claim 1, with the power connection member including a first end and a second end spaced from the first end, with the first electrode and the second electrode located at the first end of the power connection member, with the first extending portion and the second extending portion located at the second end of the power connection member, with the first electrode of the power connection member substantially having a shape of a hollow cylinder and abutted against the inner edge of the protrusion, with a side of the second electrode of the power connection member adjacent to the heating member substantially having a shape of a disk, and with the first electrode of the power connection member encircling the second electrode of the power connection member, the third electrode and an end of the heating member adjacent to the second electrode.

3. The electric heating tool according to claim 2, with the seat including a through-hole extending therethrough and receiving the heating member and the third electrode, with the heating member including a first extending section, a second extending section, and a heating portion, with the first extending section and the second extending section respectively connected with the heating portion, with the first extending section inserting through and electrically connecting to the third electrode, and with the second extending section electrically connected to the second electrode of the power connection member.

4. The electric heating tool according to claim 3, with the third electrode including a conduction coil slidely and electrically connected to the first electrode of the power connection member.

5. The electric heating tool according to claim 4, with the heating member including a fourth electrode, with the second extending section inserting through and electrically connecting to the fourth electrode, with the through-hole including a first section and a second section parallel to the first section, with the seat including a protruded portion formed on an end thereof and adjacent to the guiding portion, with the second section extending through the protruded portion, with the third electrode received into the first section, and with the fourth electrode received into the second section.

6. The electric heating tool according to claim 5, with the through-hole further including a third section interconnected with the first section and the second section, and with an end of the third electrode adjacent to the first and second extending sections received into the third section.

7. The electric heating tool according to claim 6, with the heating member being a rectangular sheet, with a rectangular end face of the heating member having a first side and a second side perpendicular to each other, and with a first side length of the first side at least fivefold larger than a second side length of the second side.

8. The electric heating tool according to claim 5, with the seat including an extruded portion formed on an end thereof opposite to the protruded portion, with the first section and the second section of the through-hole extending through the extruded portion, and with the heating portion of the heating member substantially formed as a heating coil.

9. The electric heating tool according to claim 8, with the heating device including a jacket and a housing, with the jacket connected to the extruded portion and including two orifices interconnected with the first section and the second section of the through-hole, with the third electrode inserting through one of the two orifices, with the fourth electrode inserting through the other one of the two orifices, with the housing connected with the jacket and encircling the third electrode and the fourth electrode.

10. The electric heating tool according to claim 4, with the heating device including an insulation member mounted on the second extending section and located between the third electrode and the heating member, and with the heating portion of the heating member substantially formed as a heating coil.

11. The electric heating tool according to claim 10, with the heating device including a thermal conduction member and an insulation tube, with the thermal conduction member encircling the heating portion of the heating member, with the first extending section located between the thermal conduction member and the third electrode, with the insulation tube including a first end and a second end spaced from the first end thereof, with the first end of the insulation tube mounted to the thermal conduction member, and with the second end of the insulation tube engaged into the through-hole of the seat.

12. The electric heating tool according to claim 1, with the body including a receiving space interconnected with the inner edge of the protrusion, with the first extending portion and the second extending portion of the power connection member respectively extending towards the receiving space, with the handle device including a battery assembly and an electrical conduction assembly, with the battery assembly and the electrical conduction assembly received in the receiving space and electrically connected with each other, with the battery assembly including a first pole and a second pole opposite to the first pole, with the electrical conduction assembly including a first electrical conduction member, a second electrical conduction member, and a third electrical conduction member, with the first electrical conduction member including a first end and a second end spaced from the first end thereof, with the first end of the first electrical conduction member electrically connected to the first extending portion, with the second electrical conduction member including a first end and a second end spaced from the first end thereof, with the first end of the second electrical conduction member electrically connected to the second extending portion, with the second end of the second electrical conduction member electrically connected to the first pole of the battery assembly, with the third electrical conduction member including a first end and a second end spaced from the first end thereof, with the first end of the third electrical conduction member releasably and electrically connected to the second end of the first electrical conduction member, and with the second of the third electrical conduction member electrically connected to the second pole of the battery assembly.

13. The electric heating tool according to claim 12, with the handle device including a control button and an indicator light, with the control button slidely mounted to the body and selectively pushing the third electrical conduction member to contact with the first electrical conduction member, and with the indicator light located on the body and electrically connected to the first electrical conduction member.

14. The electric heating tool according to claim 6, with the body including a guiding slot interconnected with the receiving space, with the control button including a pushing portion, a connecting portion, a positioning portion, and an abutting portion, with the connecting portion located between the pushing portion and the positioning portion, with the abutting portion disposed at an end of the positioning portion opposite to the connecting portion, with the connecting portion slidely received in the guiding slot, and with the abutting portion selectively pushing the first end of the third electrical conduction member to facilitate the second end of the first electrical conduction member and the first end of the third electrical conduction member to electrically connect with each other.

15. The electric heating tool according to claim 14, with the body including two positioning slots disposed adjacent to the guiding slot and orderly arranged along a sliding direction of the control button, and with the positioning portion of the control button including a flange extending towards the pushing portion and engageable into one of the two positioning slots.

16. The electric heating tool according to claim 15, with the protrusion of the body including an outer threaded portion, with the sleeve including an inner threaded portion formed around the inner periphery thereof and engaged with the outer threaded portion of the protrusion of the body.

* * * * *